(12) United States Patent
Watanabe et al.

(10) Patent No.: US 6,244,676 B1
(45) Date of Patent: Jun. 12, 2001

(54) NEGATIVE PRESSURE CONTROL APPARATUS FOR BRAKE BOOSTER

(75) Inventors: Ryochi Watanabe, Susono; Yoshihisa Yamada; Hiroaki Endo, both of Shizuoka-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/298,175

(22) Filed: Apr. 23, 1999

(30) Foreign Application Priority Data

Jun. 5, 1998 (JP) .................................................. 10-158022

(51) Int. Cl.$^7$ ...................................................... B60T 8/32
(52) U.S. Cl. ............................................. 303/191; 60/397
(58) Field of Search ............................. 303/191; 60/397, 60/329

(56) References Cited

U.S. PATENT DOCUMENTS

| | | | |
|---|---|---|---|
| 5,802,852 | * | 9/1998 | Harbaugh ............................ 60/547.1 |
| 5,846,164 | * | 12/1998 | Harada ................................. 477/205 |
| 5,878,651 | * | 3/1999 | Myers ....................................... 92/48 |
| 5,915,357 | * | 6/1999 | Harada et al. ......................... 123/399 |
| 5,950,594 | * | 9/1999 | Mizuno ................................. 123/295 |
| 5,950,595 | * | 9/1999 | Yoshioka et al. ..................... 123/295 |
| 5,979,162 | * | 11/1999 | Kawasumi et al. ..................... 60/552 |
| 6,006,716 | | 12/1999 | Harada et al. . |
| 6,017,100 | * | 1/2000 | Mizuno et al. .................... 303/114.3 |
| 6,039,411 | * | 3/2000 | Tozu et al. ......................... 303/116.1 |
| 6,050,089 | * | 4/2000 | Towers et al. .......................... 60/329 |
| 6,095,116 | | 8/2000 | Matsushita et al. . |

FOREIGN PATENT DOCUMENTS

| | | |
|---|---|---|
| 5-208663 | 8/1993 | (JP) . |
| 5-208665 | 8/1993 | (JP) . |
| 7-247866 | 9/1995 | (JP) . |
| 8-164840 | 6/1996 | (JP) . |
| 8-318764 | 12/1996 | (JP) . |

* cited by examiner

Primary Examiner—Robert J. Oberleitner
Assistant Examiner—Xuan Lan Nguyen
(74) Attorney, Agent, or Firm—Oliff & Berridge, PLC (57) ABSTRACT

A negative pressure control apparatus for a brake booster for controlling a negative pressure in a negative pressure chamber of the brake booster is provided. The apparatus is applied to a system having a booster charge mechanism for generating a fluid pressure by using the negative pressure in the negative pressure chamber and a fluid pressure control mechanism for controlling a brake fluid pressure by using the fluid pressure generated by the booster charge mechanism as a fluid pressure source. The apparatus includes a negative pressure controller for controlling the negative pressure in the negative pressure chamber to be at least a predetermined target negative pressure. A temperature detector detects information relating to a temperature of brake fluid. A target negative pressure setting part sets the predetermined negative pressure based on the temperature of the brake fluid.

14 Claims, 6 Drawing Sheets

NEGATIVE PRESSURE CONTROL APPARATUS FOR BRAKE BOOSTER

BACKGROUND OF THE INVENTION

1. Field of The Invention

The present invention relates to a negative pressure control apparatus for a brake booster, and particularly to a negative pressure control apparatus for controlling negative pressure in a brake booster in a system which has a function of increasing a brake fluid pressure by increasing the negative pressure of the brake booster.

2. Description of the Related Art

Conventionally, as disclosed in Japanese Laid-Open Patent Application No. 5-208663, a braking apparatus having a brake booster is known. The brake booster is a mechanism which assists a brake operation by using an intake manifold negative pressure as a power source so that a larger braking force can be generated. The above braking apparatus has a function of increasing a master cylinder pressure by increasing negative pressure of the brake booster when a brake operation is not being performed. Hereinafter, this function is referred to as a booster charge function.

The above braking apparatus also has a function of performing an automatic brake control for generating a braking force when an obstacle is detected ahead of the vehicle in a situation where no brake operation is being performed. This automatic brake control is achieved by increasing the master cylinder pressure using the above-mentioned booster charge function. Additionally, the above braking apparatus increases the negative pressure of the brake booster toward a predetermined target value when execution of the automatic brake control is predicted so as to positively perform the brake control.

However, when a temperature of brake fluid is low, a delay occurs in transmitting a fluid pressure to wheel cylinders due to an increase in viscous resistance of the brake fluid. Thus, in the above-mentioned conventional braking apparatus, a response of the automatic brake control controlling the brake fluid pressure may be delayed when the temperature is low.

SUMMARY OF THE INVENTION

It is an object of the present invention to provide a negative pressure control apparatus for a brake booster which can always control the brake fluid pressure with a fast response time regardless of the temperature of the brake fluid in a brake system having the booster charge function.

The above-mentioned object can be achieved by a negative pressure control apparatus for a brake booster for controlling a negative pressure in a negative pressure chamber of the brake booster, which apparatus is provided in a system having a booster charge mechanism for generating a fluid pressure by using the negative pressure in the negative pressure chamber and a fluid pressure control mechanism for controlling a brake fluid pressure by using the fluid pressure generated by the booster charge mechanism, the apparatus comprising:

a negative pressure controller for controlling the negative pressure in the negative pressure chamber to be at least a predetermined target negative pressure;

a temperature detector for detecting information relating to a temperature of brake fluid; and a target negative pressure setting part for setting the predetermined target negative pressure based on the temperature of the brake fluid.

In this invention, the negative pressure controller controls the negative pressure in the negative pressure chamber to be at least a predetermined target value. The booster charge mechanism generates a fluid pressure by using the negative pressure in the negative pressure chamber, and the fluid pressure control mechanism controls a brake fluid pressure by using the fluid pressure generated by the booster charge mechanism. When a temperature of brake fluid is low, a delay may occur in transmission of fluid pressure in the fluid pressure control mechanism due to an increase in viscosity of the brake fluid. When a delay occurs in transmission of fluid pressure, a response of the fluid control mechanism controlling the brake fluid pressure is delayed. According to the present invention, the target negative pressure setting part sets the target value based on the temperature of the brake fluid. In this case, the fluid pressure generated by the booster charge mechanism can be increased in accordance with the increase in viscosity of the brake fluid, and thus the delay in transmission of fluid pressure is compensated for. Therefore, according to the present invention, the brake fluid pressure can be controlled with a fast response time regardless of the temperature.

Other objects and further features of the present invention will be apparent from the following detailed description when read in conjunction with the accompanying drawings.

DESCRIPTION OF THE PREFERRED EMBODIMENTS

Figure 1:
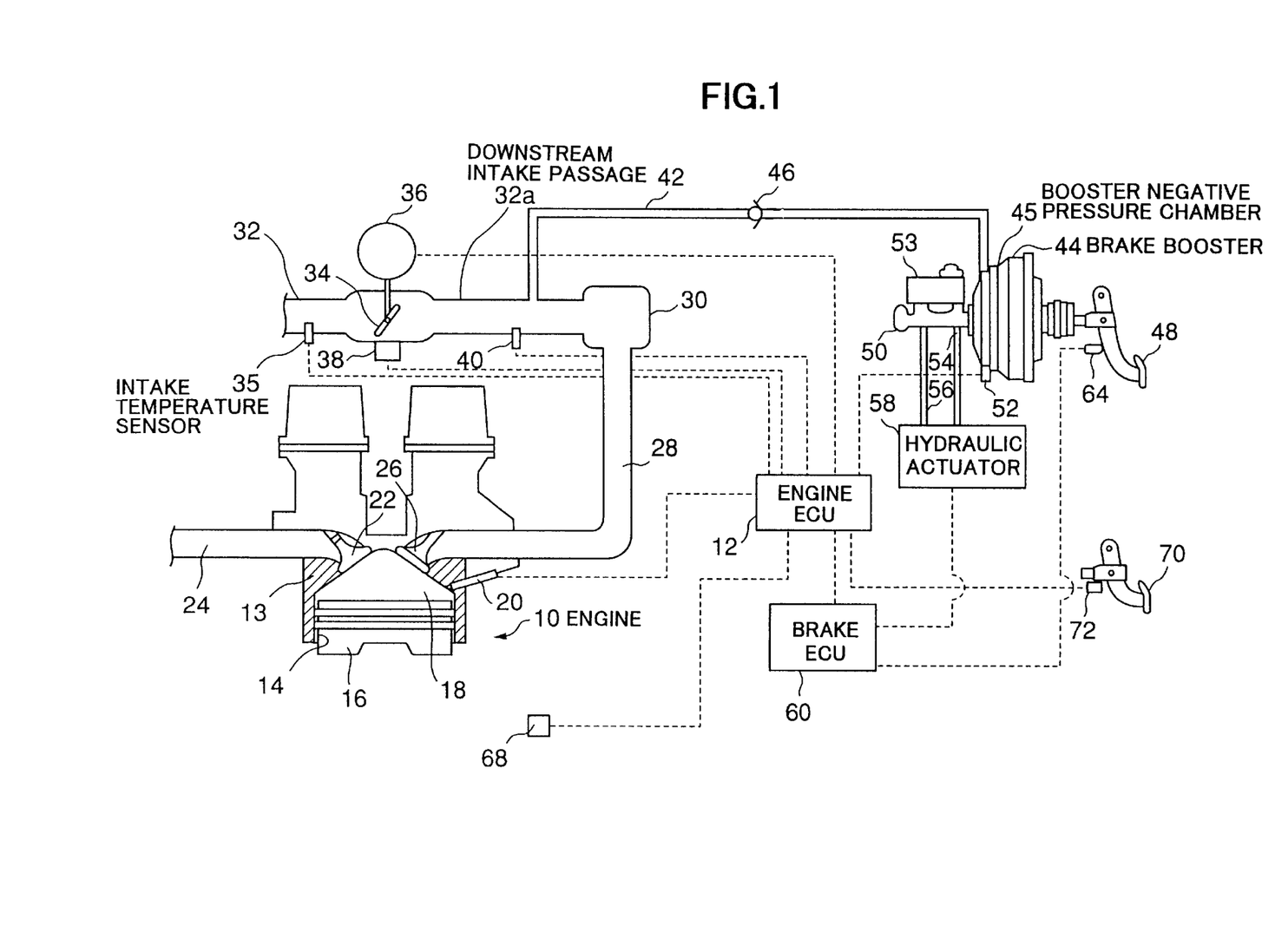
FIG. 1 is a system structure diagram of an embodiment of the present invention.

FIG. 1 shows a system structure diagram of an embodiment according to the present invention. The system of the present embodiment is provided on a vehicle. As shown in FIG. 1, the system includes an engine 10. The engine 10 is controlled by an engine ECU 12. The engine 10 has a cylinder block 13. A cylinder 14 is formed inside the cylinder block 13. The engine 10 has a plurality of cylinders and only one cylinder 14 is shown in FIG. 1.

A piston 16 is disposed in the cylinder 14. The piston 16 can move vertically in the cylinder 14. A combustion chamber 18 is defined inside the cylinder 14 above the piston 16. An injection port of a fuel injector 20 is exposed in the combustion chamber 18. The fuel injector 20 injects fuel in the combustion chamber 18 in response to a control signal supplied by the engine ECU 12. That is, the engine 10 of the present embodiment is a direct-injection engine.

An exhaust pipe 24 is connected to the combustion chamber 18 via an exhaust valve 22. Additionally, an intake manifold 28 is connected to the combustion chamber 18 via an intake valve 26. A surge tank 30 is connected to an upstream side of the intake manifold 28. Further, an intake pipe 32 is connected to an upstream side of the surge tank 30.

A throttle valve 34 is disposed in the intake pipe 32. The throttle valve 34 is connected to a throttle motor 36. The throttle motor 36 is electrically connected to the engine ECU 12. The throttle motor 36 changes an opening of the throttle valve 34 (hereinafter referred to as a throttle opening SC) in response to a control signal supplied by the engine ECU 12. A throttle-opening sensor 38 is disposed near the throttle valve 34. The throttle-opening sensor 38 delivers an electric signal in accordance with the throttle opening SC to the engine ECU 12. The engine ECU 12 detects the throttle opening SC based on the signal delivered by the throttle-opening sensor 38.

An intake-temperature sensor 35 is disposed in the intake pipe 32 at a position upstream of the throttle valve 34. The intake-temperature sensor 35 delivers an electric signal to the engine ECU 12 in accordance with a temperature of intake air (hereinafter referred to as an intake temperature T). The engine ECU 12 detects the intake temperature T based on the signal delivered by the intake-temperature sensor 35.

An intake-pressure sensor 40 is disposed in the intake pipe 32 at a position downstream of the throttle valve 34. Hereinafter, this part of the intake pipe 32 is referred to as a downstream intake passage 32a. The intake-pressure sensor 40 delivers an electric signal to the engine ECU 12 in accordance with a negative pressure in the downstream intake passage 32a (hereinafter referred to as an intake manifold negative pressure PM). The engine ECU 12 detects the intake manifold negative pressure PM based on the signal delivered by the intake-pressure sensor 40.

One end of a negative pressure supply passage 42 is connected to the downstream intake passage 32a. The other end of the negative pressure supply passage 42 is connected to a negative pressure chamber of a brake booster 44. Hereinafter, the negative pressure chamber of the brake booster 44 is referred to as a booster negative pressure chamber 45.

A check valve 46 is disposed in the negative pressure supply passage 42. The check valve 46 is a one-way valve which permits a flow of air only in a direction from the booster negative pressure chamber 45 to the downstream intake passage 32a. Thus, when the intake manifold negative pressure PM is larger than a negative pressure in the booster negative pressure chamber 45 (hereinafter referred to as a booster negative pressure PB), the booster negative pressure PB is increased until it is equalized with the intake manifold pressure PM. On the other hand, when the intake manifold negative pressure PM is smaller than the booster negative pressure PB, air is prevented from flowing from the downstream intake passage 32a to the booster negative pressure chamber 45, and thus the booster negative pressure PB is prevented from being decreased.

It should be noted that, in the present specification, a "negative pressure" is represented by a differential pressure relative to the atmospheric pressure. Thus, an expression that "a negative pressure is large" means that the differential pressure relative to the atmospheric pressure is large, that is, an absolute pressure is low.

The brake booster 44 is connected to a brake pedal 48 and a master cylinder 50. The brake booster 44 assists an operation of the brake pedal 48 by using the booster negative pressure PB as a power source so that a higher fluid pressure is generated in fluid chambers of the master cylinder 50. Hereinafter, the fluid pressure generated in the fluid chambers of the master cylinder 50 is referred to as a master cylinder pressure $P_{M/C}$.

A booster pressure sensor 52 is disposed in the booster negative pressure chamber 45. The booster pressure sensor 52 delivers an electric signal to the engine ECU 12 in accordance with the booster negative pressure PB. The engine ECU 12 detects the booster negative pressure PB based on the signal delivered by the booster pressure sensor 52.

A reservoir tank 53 is disposed on the top of the master cylinder 50. Additionally, a hydraulic actuator 58 is connected to fluid chambers of the master cylinder 50 via fluid pressure passages 54, 56, respectively. The hydraulic actuator 58 is controlled by a brake ECU 60. Structures and operations of the hydraulic actuator 58 and the brake booster 44 will be described later in detail.

A brake switch 64 is disposed near the brake pedal 48. The brake switch 64 delivers an ON signal to the brake ECU 60 only when the brake pedal 48 is depressed. The brake ECU 60 determines whether or not a brake operation is performed based on the signal delivered by the brake switch 64.

A revolution sensor 68 is provided to the engine 10. The revolution sensor 68 delivers a pulse signal to the engine ECU 12 in accordance with a rotational speed Ne of the engine 10. The engine ECU 12 detects the rotational speed Ne based on the signal delivered by the revolution sensor 68.

An accelerator-opening sensor 72 is provided near an accelerator pedal 70. The accelerator-opening sensor 72 delivers an electric signal to the engine ECU 12 in accordance with a travel of the accelerator pedal 70 (hereinafter referred to as an accelerator opening AC). The engine ECU 12 detects the accelerator opening AC based on the signal delivered by the accelerator-opening sensor 72.

Figure 2:
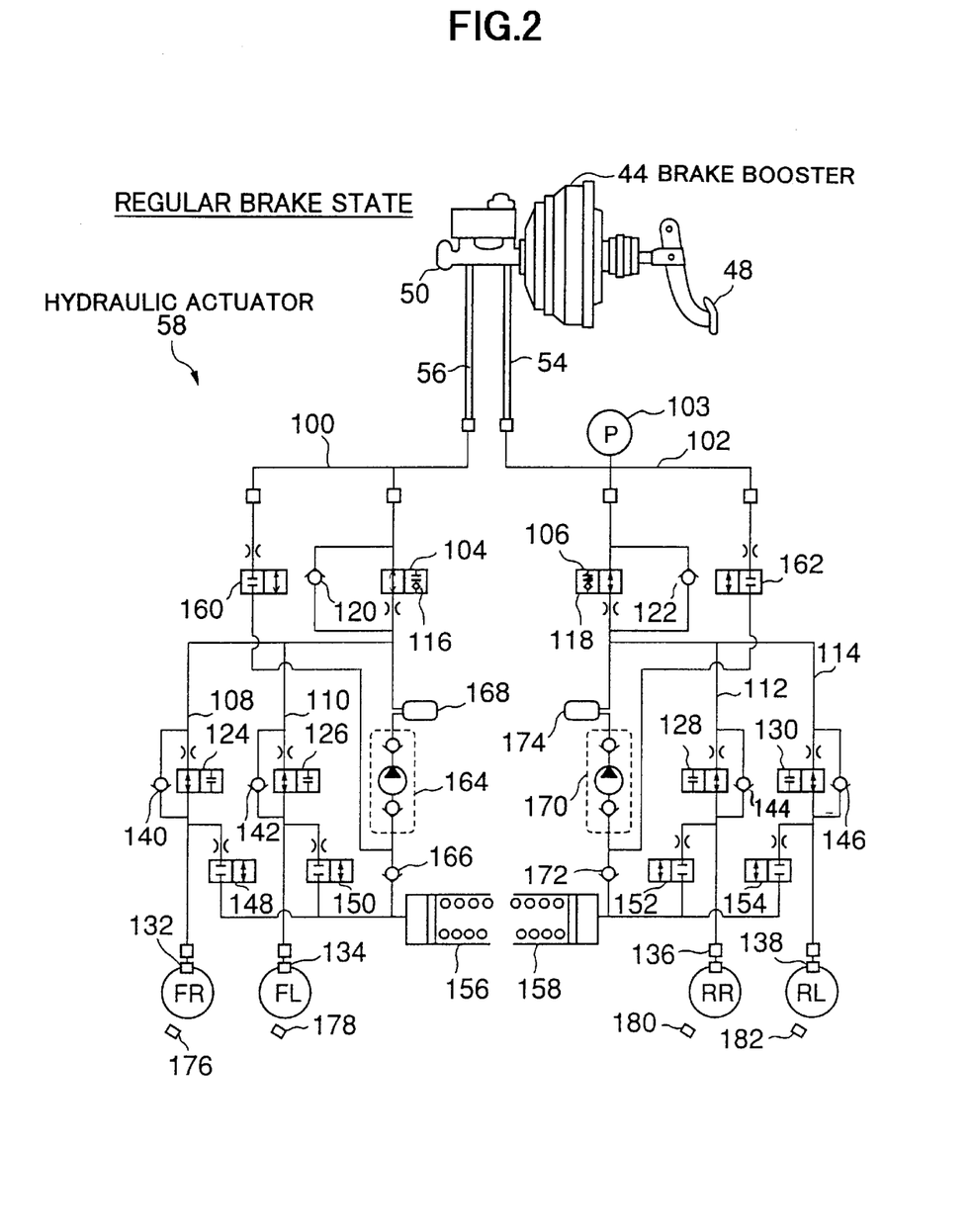
FIG. 2 is a structure diagram of a hydraulic actuator provided in the system of the present embodiment.

Now, a description will be given of the structure and operation of the hydraulic actuator 58. FIG. 2 shows a structure diagram of the hydraulic actuator 58. As shown in FIG. 2, the hydraulic actuator 58 includes a front-wheel fluid pressure passage 100 connected to the fluid pressure passage 56 and a rear-wheel fluid pressure passage 102 connected to the fluid pressure passage 54. A fluid pressure sensor 103 is disposed in the rear-wheel fluid pressure passage 102. The fluid pressure sensor 103 delivers an electric signal to the brake ECU 60 in accordance with a fluid pressure in the rear-wheel fluid pressure passage 102 (that is, the master cylinder pressure $P_{M/C}$) The brake ECU 60 detects the master cylinder pressure $P_{M/C}$ based on the signal delivered by the fluid pressure sensor 103.

The front-wheel fluid pressure passage 100 and the rear-wheel fluid pressure passage 102 are connected to a front-master-cut solenoid valve (hereinafter referred to as SMF) 104 and a rear-master-cut solenoid valve (hereinafter referred to as SMR) 106, respectively. The SMF 104 is connected to a fluid pressure passage 108 corresponding to a front-right wheel FR and a fluid pressure passage 110 corresponding to a front-left wheel FL. Similarly, the SMR 106 is connected to a fluid pressure passage 112 corresponding to a rear-right wheel RR and a fluid pressure passage 114 corresponding to a rear-left wheel RL.

The SMF 104 and the SMR 106 have relief valves 116 and 118 provided therein, respectively. The SMF 104 directly connects the front-wheel fluid pressure passage 100 and fluid pressure passages 108, 110 in an OFF state, and connects the front-wheel fluid pressure passage 100 and fluid pressure passages 108, 110 via the relief valve 116 in an ON state. Similarly, the SMR 106 directly connects the rear-wheel fluid pressure passage 102 and the fluid pressure passages 112, 114 in an OFF state, and connects the rear-wheel fluid pressure passage 102 and fluid pressure passages 112, 114 via the relief valve 118 in an ON state. The relief valves 116 and 118 are opened when fluid pressures in the fluid pressure passages 108, 110 and the fluid pressure passages 112, 114 are higher than fluid pressures in the front-wheel fluid pressure passage 100 and rear-wheel fluid pressure passage 102, respectively, by a predetermine relief pressure Pr.

Check valves 120 and 122 are provided in parallel with the SMF 104 and the SMR 106, respectively. The check valves 120 and 122 are one-way valves which permit a flow of brake fluid from the front-wheel fluid pressure passage 100 and rear-wheel fluid pressure passage 102 to the fluid pressure passages 108, 110 and the fluid pressure passages 112, 114, respectively.

The fluid pressure passages 108, 110, 112, 114 are connected to a front-right wheel holding solenoid valve (hereinafter referred to as SFRH) 124, a front-left wheel holding solenoid valve (hereinafter referred to as SFLH) 126, a rear-right wheel solenoid valve (hereinafter referred to as SRRH) 128, and a rear-left wheel solenoid valve (hereinafter referred to as SRLH) 130, respectively. The SFRH 124, the SFLH 126, the SRRH 128 and the SRLH 130 are connected to wheel cylinders 132, 134, 136, 138, respectively.

The SFRH 124 is a two-position solenoid valve which connects the fluid pressure passage 108 and the wheel cylinder 132 in an OFF state, and disconnects the fluid pressure passage 108 and the wheel cylinder 132 in an ON state. Similarly, SFLH 126, SRRH 128 and SRLH 130 connect the fluid pressure passages 110, 112, 114 and the wheel cylinders 134, 136, 138, respectively, in an OFF state, and disconnect the fluid pressure passages 110, 112, 114 and the wheel cylinders 134, 136, 138, respectively, in an ON state.

Check valves 140, 142, 144, 146 are disposed in parallel with the SFRH 124, SFLH 126, SRRH 128, and SRLH 130, respectively. The check valves 140, 142, 144, 146 are one-way valves which permit a flow of brake fluid from the wheel cylinders 132, 134, 136, 138 to the fluid pressure passages 108, 110, 112, 114, respectively.

A front-right wheel pressure decreasing solenoid valve (hereinafter referred to as SFRR) 148, a front-left wheel pressure decreasing solenoid valve (hereinafter referred to as SFLR) 150, a rear-right wheel pressure decreasing solenoid valve (hereinafter referred to as SRRR) 152, and a rear-left wheel pressure decreasing solenoid valve (hereinafter referred to as SRLR) 154 are connected to the wheel cylinders 132, 134, 136, 138, respectively. A front reservoir 156 is connected to the SFRR 148 and the SFLR 150, and a rear reservoir 158 is connected to the SRRR 152 and the SRLR 154.

The SFRR 148 and the SFLR 150 are two-position solenoid valves which disconnect the wheel cylinders 132, 134 of the front wheels and the front reservoir 156, respectively, in an OFF state, and connect the wheel cylinders 132, 134 and the front reservoir 156, respectively, in an ON state. Similarly, the SRRR 152 and the SRLR 154 are two-position solenoid valves which disconnect the wheel cylinders 136, 138 of the rear wheels and the rear reservoir 158, respectively, in an OFF state, and connect the wheel cylinders 136, 138 and the rear reservoir 158, respectively, in an ON state.

Hereinafter, the SFRH 124, SFLH 126, SRRH 128 and the SRLH 130 may be referred to as "holding solenoids SH" as a whole. Additionally, the SFRR 148, SFLR 150, SRRR 152 and the SRLR 154 may be referred to as "pressure decreasing solenoids SR" as a whole.

The front-wheel fluid pressure passage 100 and the rear wheel fluid pressure passage 102 are also connected to a front-master pump-up solenoid valve (hereinafter referred to as SRMF) 160 and a rear-master pump-up solenoid valve (hereinafter referred to as SRMR) 162, respectively. The SRMF 160 is connected to an inlet of a front pump 164. The inlet of the front pump 164 is connected to the front reservoir 156 via a check valve 166. The check valve 166 is a one-way valve which permits a flow of brake fluid from the front reservoir 156 to the front pump 164. An outlet of the front pump 164 is connected to the fluid pressure passages 108, 110 via a damper 168. Similarly, the SRMR 162 is connected to an inlet of a rear pump 170. The inlet of the rear pump 170 is connected to the rear reservoir 158 via a check valve 172. The check valve 172 is a one-way valve which permits a flow of brake fluid from the rear reservoir 158 to the rear pump 170. An outlet of the rear pump 170 is connected to the fluid pressure passages 112, 114 via a damper 174.

Wheel speed sensors 176, 178, 180, 182 are provided near the front-right wheel FR, the front-left wheel FL, the rear-right wheel RR and the rear-left wheel RL. The wheel speed sensors 176, 178, 180, 182 deliver pulse signals to the brake ECU 60 in accordance with a wheel speed VW of each wheel. The brake ECU 60 detects the wheel speeds VW based on the signals delivered by the wheel speed sensors 176, 178, 180, 182.

Now a description will be given of an operation of the hydraulic actuator 58. The system of the present embodiment can achieve (i) a regular brake function for generating a braking force in accordance with the master cylinder pressure $P_{M/C}$, (ii) an ABS function for preventing a lock of the wheels, (iii) a VSC function for stabilizing a behavior of the vehicle based on the braking force, and (iv) a TRC function for preventing a slip of the wheels due to an excessive driving torque.

The regular brake function is achieved by turning off all of the solenoid valves provided in the hydraulic actuator 58 as shown in FIG. 2 and also turning off the front pump 164 and the rear pump 170. Hereinafter, the state shown in FIG. 2 is referred to as a regular brake state.

In the regular brake state shown in FIG. 2, the wheel cylinder 132 of the front right wheel FR is connected to the master cylinder 50 via the fluid pressure passage 108 and the front-wheel fluid pressure passage 100. Additionally, the wheel cylinder 134 of the front left wheel FL is connected to the master cylinder 50 via the fluid pressure passage 110 and the front-wheel fluid pressure passage 100. Similarly, the wheel cylinder 136 of the rear right wheel RR is connected to the master cylinder 50 via the fluid pressure passage 112 and the rear-wheel fluid pressure passage 102, and the wheel cylinder 138 of the rear-left wheel RL is connected to the master cylinder 50 via the fluid pressure passage 114 and the rear-wheel fluid pressure passage 102. In this state, a fluid pressure in the wheel cylinders 132 to 138 (hereinafter referred to as a wheel cylinder pressure $P_{W/C}$) is controlled to be equal to the master cylinder pressure $P_{M/C}$. Thus, the regular brake function can be achieved in the regular brake state shown in FIG. 2.

The ABS function can be achieved by turning on the front pump 164 and the rear pump 170 and operating the holding solenoid valves SH and the pressure decreasing solenoid valves SR in accordance with a slip state of each wheel. Hereinafter, a control for achieving the ABS function in the present embodiment is referred to as an ABS control.

The brake ECU 60 starts the ABS control when the brake pedal 48 is depressed and an excessive slip rate is detected in any one of the wheels. While the ABS control is being executed, the master cylinder pressure $P_{M/C}$ increased by the depression of the brake pedal 48 is introduced to the fluid pressure passages 108, 110 corresponding to the front wheels and the fluid pressure passages 112, 114 corresponding to the rear wheels via the front-wheel fluid pressure passage 100 and the rear-wheel fluid pressure passage 102, respectively. In such a situation, when the holding solenoid valves SH are opened and the pressure decreasing solenoid valves SR are closed, the wheel cylinder pressure $P_{W/C}$ for each wheel is increased toward the master cylinder pressure $P_{M/C}$. Hereinafter, this state is referred to as an ABS pressure increasing mode.

When both the holding solenoid valves SH and the pressure decreasing solenoid valves SR are closed during execution of the ABS control, the wheel cylinder pressure $P_{W/C}$ for each wheel is maintained. Hereinafter, this state is referred to as an ABS holding mode. Additionally, when the holding solenoid valves SH are closed and the pressure decreasing solenoid valves SR are opened during execution of the ABS control, the wheel cylinder pressure $P_{W/C}$ for each wheel is decreased. Hereinafter, this state is referred to as an ABS pressure decreasing mode.

The brake ECU 60 controls the holding solenoid valves SH and the pressure decreasing solenoid valves SR in accordance with a slip state of each wheel so that the ABS pressure increasing mode, the ABS holding mode, and the ABS pressure decreasing mode are appropriately achieved for each wheel during execution of the ABS control. When the holding solenoid valves SH and the pressure decreasing solenoid valves SR are controlled as mentioned above, the wheel cylinder pressure $P_{W/C}$ for all of the wheels is controlled to be a pressure which does not generate an excessive slip rate in the respective wheel. Thus, according to the above-mentioned control, the ABS function can be achieved in the system of the present embodiment.

When the ABS pressure decreasing mode is achieved during execution of the ABS control, brake fluid in the wheel cylinders 132 to 138 flows into the front reservoir 156 and the rear reservoir 158. The brake fluid which has flowed into the front reservoir 156 and the rear reservoir 158 is pumped up by the front pump 164 and the rear pump 170 and supplied to the fluid pressure passages 108, 110, 112, 114.

A part of the brake fluid supplied to the fluid pressure passages 108, 110, 112, 114 flows into the wheel cylinders 132 to 138 when the ABS pressure increasing mode is achieved. The remainder of the brake fluid flows into the master cylinder 50 so as to compensate for the brake fluid which has flowed out. Thus, according to the present embodiment, an excessive travel of the brake pedal 48 is not generated during execution of the ABS-control.

Figure 3:
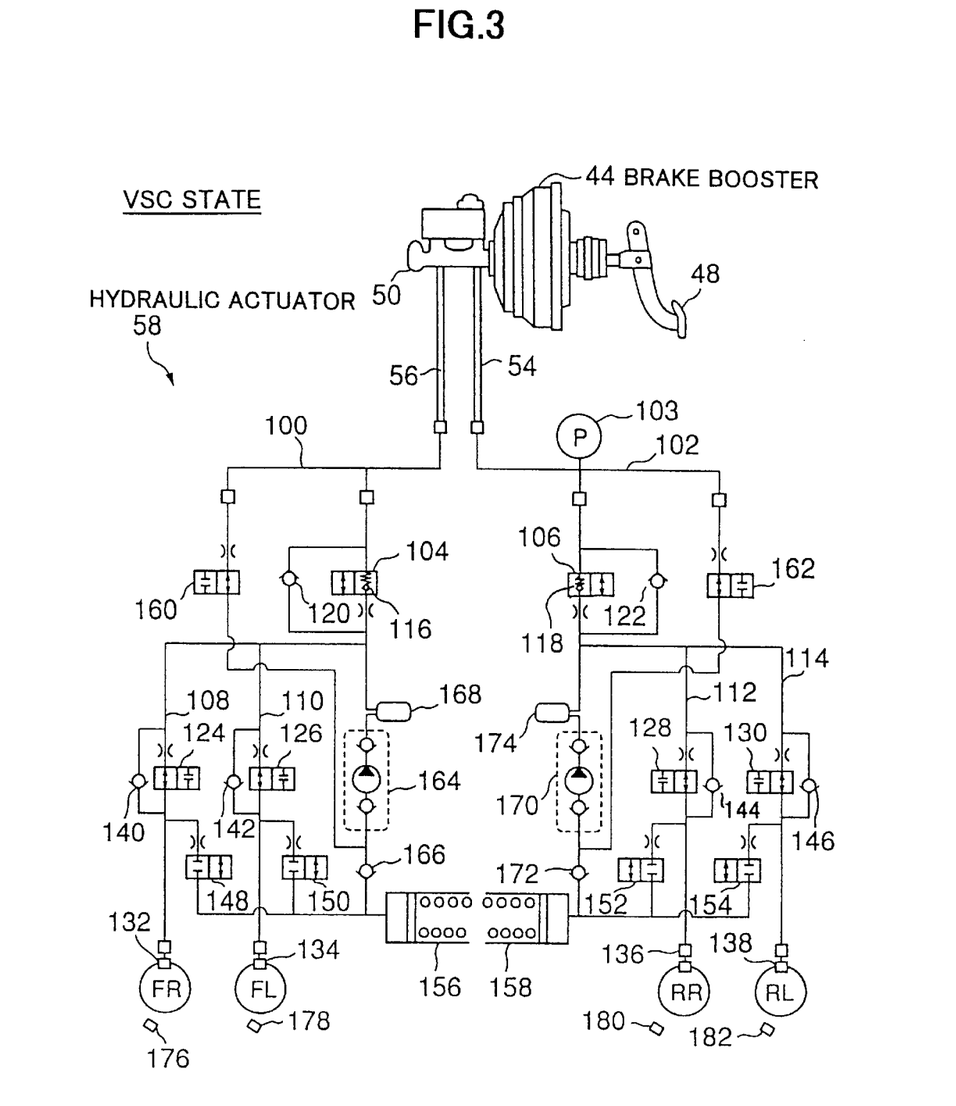
FIG. 3 is a diagram illustrating a VSC state of the hydraulic actuator shown in FIG. 2.

The VSC function can be achieved by controlling the wheel cylinder pressure $P_{W/C}$ by using the front pump 164 and the rear pump 170 as a fluid pressure source in a situation where the brake pedal 48 is not depressed. Hereinafter, a control for achieving the VSC function is referred to as a VSC control. The brake ECU 60 determines whether or not an unstable trend is generated in a behavior of the vehicle based on, for example, a vehicle speed, an acceleration, a lateral acceleration, and a yaw rate. When it is determined that an unstable trend is generated in a behavior of the vehicle, the brake ECU 60 starts, the VSC control. The VSC control is achieved by turning on the SMF 104, the SMR 106, the SRMF 160 and the SRMR 162 as shown in FIG. 3, also turning on the front pump 164 and the rear pump 170, and operating the holding solenoid valves SH and the pressure decreasing solenoid valves SR in accordance with a behavior of the vehicle. Hereinafter, the state shown in FIG. 3 is referred to as a VSC state.

In the VSC state shown in FIG. 3, the inlet of the front pump 164 is connected to the master cylinder 50 via the front-wheel fluid pressure passage 100, and the outlet of the front pump 164 is disconnected from the master cylinder 50 so long as a discharge pressure of the front pump 164 does not exceed the relief pressure Pr of the relief valve 116. Similarly, in the VSC state, the inlet of the rear pump 170 is connected to the master cylinder 50 via the rear-wheel fluid pressure passage 102, and the outlet of the rear pump 170 is disconnected from the master cylinder 50 so long as a discharge pressure of the rear pump 170 does not exceed the relief pressure Pr of the relief valve 118. Thus, brake fluid in the master cylinder 50 is pumped up by the front pump 164 and the rear pump 170 to the fluid pressure passages 108, 110 and the fluid pressure passages 112, 114, respectively.

In such a situation, when the holding solenoid valves SH are opened and the pressure decreasing solenoid valves SR are closed, wheel cylinders 132 to 138 are connected to the fluid pressure passages 108 to 114, respectively. In this case, the brake fluid pumped up to the fluid pressure passages 108 to 114 by the front pump 164 and the rear pump 170 is supplied to the wheel cylinders 132 to 138 and thus the wheel cylinder pressure $P_{W/C}$ for each wheel is increased. Hereinafter, this state is referred to as a VSC pressure increasing mode.

When both the holding solenoid valves SH and the pressure decreasing solenoid valves SR are closed in the VSC state, the wheel cylinder pressure $P_{W/C}$ is maintained. Hereinafter, this state is referred to as a VSC holding mode. Additionally, when the holding solenoid valves SH are closed and the pressure decreasing solenoid valves SR are opened in the VSC state, the wheel cylinders 132 to 138 are connected to the front reservoir 156 or the rear reservoir 158 and thus the wheel cylinder pressure $P_{W/C}$ for each wheel is decreased. Hereinafter, this state is referred to as a VSC pressure decreasing mode.

The brake ECU 60 operates the holding solenoid valves SH and the pressure decreasing solenoid valves SR in accordance with a behavior of the vehicle so that the VSC pressure increasing mode, the VSC holding mode, and the VSC pressure decreasing mode are appropriately achieved for each of the wheels during execution of the VSC control. When the holding solenoid valves SH and the pressure decreasing solenoid valves SR are controlled as mentioned above, the wheel cylinder pressure $P_{W/C}$ for all of the wheels is controlled to be a pressure which can suppress the unstable behavior of the vehicle. Thus, according to the above-mentioned control, the VSC function can be achieved in the system of the present embodiment.

Similar to the VSC control, the TRC function is achieved by controlling the wheel cylinder pressure $P_{W/C}$ for each wheel by using the front pump 164 and the rear pump 170 as a fluid pressure source in a situation where the brake pedal 48 is not depressed. Hereinafter, a control for achieving the TRC function is referred to as a TRC control. The brake ECU 60 starts the TRC control when the accelerator pedal 70 is operated and an excessive slip is detected in any one of the wheels. In the TRC control, the VSC pressure increasing mode, the VSC holding mode, and the VSC pressure decreasing mode are achieved for each of the wheels so that the slip rate of each wheel does not exceed a predetermined value. In this case, the wheel cylinder pressure $P_{W/C}$ of all of the wheels is controlled to be a pressure which does not generate an excessive slip rate due to a driving torque. Thus, according to the above-mentioned control, the TRC function can be achieved in the system of the present embodiment.

As mentioned above, the VSC or the TRC is achieved by pumping up brake fluid from the master cylinder 50 by the front pump 164 and the rear pump 170 in a situation where the brake pedal 48 not depressed. If the master cylinder pressure $P_{M/C}$ always corresponds to a depressing force applied tq the brake pedal 48, the master cylinder pressure $P_{M/C}$ is not increased when the brake pedal 48 is not depressed. In this case, when the VSC or the TRC is executed, the front pump 164 and the rear pump 170 are operated with inlet fluid pressure thereof being low. On the other hand, passages from the master cylinder 50 to the inlet of the front pump 164 and the rear pump 170 provide a relatively high resistance to brake fluid flowing therethrough due to orifices inside the master cylinder 50 and the hydraulic actuator 58. Thus, unless a sufficient fluid pressure is supplied to the inlets of the front pump 164 and the rear pump 170, these pumps cannot achieve an expected discharging performance. In this case, a response level of the VSC or the TRC controlling the wheel cylinder pressure $P_{W/C}$ is lowered.

In order to avoid such a problem, the brake booster 44 of the present embodiment has a function of increasing the master cylinder pressure $P_{M/C}$ in a situation where the brake pedal 48 is not depressed. Hereinafter, this function of the brake booster 44 is referred to as a booster charge function.

When the VSC or the TRC is expected to be started, the brake ECU 60 increases the master cylinder pressure $P_{M/C}$ by using the booster charge function of the brake booster 44. Thus, according to the present embodiment, pressurized brake fluid can be supplied to the inlets of the front pump 164 and the rear pump 170 at a time when the VSC or the TRC is started so that the wheel cylinder pressure $P_{W/C}$ for each wheel can be controlled with a high response level.

Figure 4:
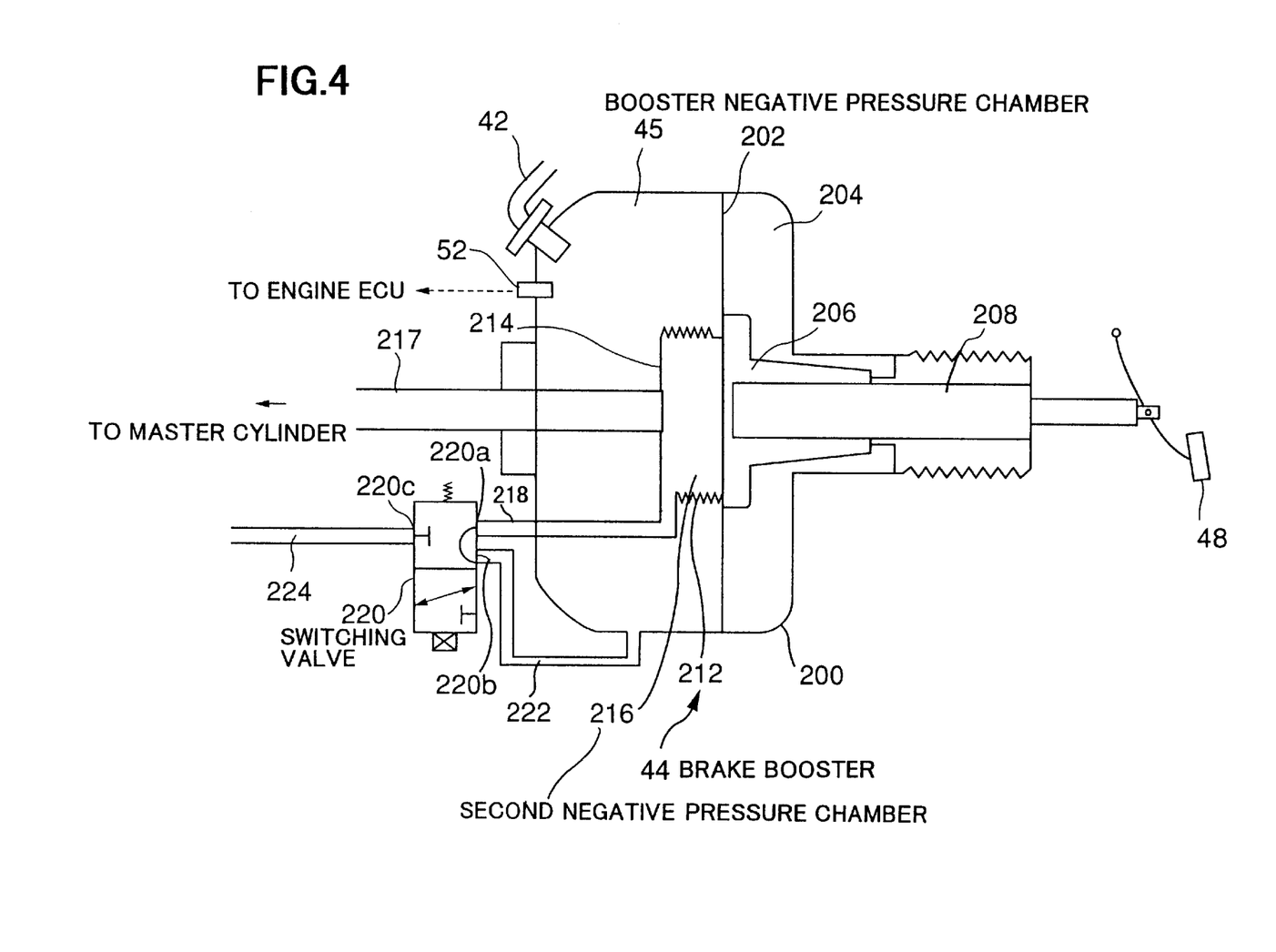
FIG. 4 is a diagram illustrating a schematic structure of a brake booster provided in the system of the present embodiment.

Now a description will be given of the brake booster 44 with reference to FIG. 4. FIG. 4 is a schematic diagram of the brake booster 44.

As shown in FIG. 4, the brake booster 44 has a shell 200. A diaphragm 202 is disposed inside the shell 200. The above-mentioned booster negative pressure chamber 45 is defined inside the shell 200 on the left side of the diaphragm 202 in FIG. 4. A booster atmospheric pressure chamber 204 is defined inside the shell 200 on the right side of the diaphragm 202 in FIG. 4. As mentioned above, the negative pressure supply passage 42 is connected to the booster negative pressure chamber 45 and the booster pressure sensor 52 is provided in the booster negative pressure chamber 45.

A negative pressure servo mechanism 206 is connected to the diaphragm 202. One end of an operating rod 208 is connected to the negative pressure servo mechanism 206. The other end of the operating rod 208 is connected to the brake pedal 48. When the brake pedal 48 is depressed, the pedal depressing force is transmitted to the negative pressure servo mechanism 206 via the operating rod 208. The negative pressure servo mechanism 206 generates a differential pressure between the booster negative pressure chamber 45 and the booster atmospheric pressure chamber 204 corresponding to the pedal depressing force by introducing atmospheric air to the booster atmospheric pressure chamber 204 in accordance with the transmitted pedal depressing force, in a manner similar to the conventional brake booster.

A second diaphragm 214 is provided in the booster negative pressure chamber 45. The second diaphragm 214 is supported on the diaphragm 202 by a cylindrical support member 212. The diaphragm 202, the support member 212 and the second diaphragm 214 define a second negative pressure chamber 216. One end of a push rod 217 is connected to the second diaphragm 214. The other end of the push rod 217 is connected to a piston of the master cylinder 50.

As mentioned above, when the brake pedal 48 is depressed, a differential pressure is generated between the booster negative pressure chamber 45 and the booster atmospheric pressure chamber 204 corresponding to the pedal depressing force. In this case, the pedal depressing force and a force corresponding to the differential pressure are simultaneously applied to the diaphragm 202. These forces are transmitted to the push rod 217 via the second diaphragm 214, and thus a master cylinder pressure $P_{M/C}$ having a predetermined power ratio with respect to the pedal depressing force is generated. In this way, the brake booster 44 can generate a large master cylinder pressure $P_{M/C}$ by assisting the depression of the brake pedal 48.

As shown in FIG. 4, one end of a switching passage 218 is connected to the second negative pressure chamber 216. Additionally, one end of a negative pressure passage 222 is connected to the booster negative pressure chamber 45. The other ends of the switching passage 218 and the negative pressure passage 222 are connected to a switching valve disposed outside the shell 200. The switching valve 220 is a two-position solenoid valve having ports 220a, 220b and 220c. The switching valve 220 closes the port 220c and connects the ports 220a and 220b in an OFF state, and closes the port 220b and connects the ports 220a and 220c in an ON state. The ON/OFF state of the switching valve 220 is controlled by the brake ECU 60.

The above-mentioned switching passage 218 is connected to the port 220a of the switching valve 220. Additionally, the above-mentioned negative pressure passage 222 is connected the port 220b of the switching valve 220. Further, an atmosphere passage 224 is connected to the port 220c of the switching valve 220. The atmospheric passage 224 is opened to the atmosphere.

In a regular situation, the brake ECU 60 maintains the switching valve 220 in an OFF state. When the switching valve 220 is in an OFF state, the negative pressure in the booster negative pressure chamber 45 is introduced to the second negative pressure chamber 216 via the negative pressure passage 222, the switching valve 220 and the switching passage 218. In this case, no differential pressure is generated on either side of the second diaphragm 214.

When a behavior of the vehicle has reached, a predetermined unstable state or a slip rate of any one of the wheels has reached a predetermined threshold value, the brake ECU 60 predicts execution of the VSC or TRC and turns on the switching valve 220. When the switching valve 220 is turned on, atmospheric air is introduced to the second negative pressure chamber(216 via the atmosphere passage 224, the switching valve 220 and the switching passage 218. In this case, a differential pressure is generated between the second negative pressure chamber 216 and the booster negative pressure chamber 45. A force corresponding to this differential pressure is transmitted to the push rod 217 in a direction toward the master cylinder 50, and thus the master cylinder pressure $P_{M/C}$ is increased. Hereinafter, a state in which the master cylinder pressure $P_{M/C}$ is increased by turning on the switching valve 220 is referred to as a booster charge states As mentioned above, when execution of the VSC or the TRC is predicted in the system of the present embodiment, the master cylinder pressure $P_{M/C}$ is increased by achieving the booster charge state. Thus, according to the system of the present embodiment, pressurized brake fluid can be supplied to the inlets of the front pump 164 and the rear pump 170 during execution of the VSC or the TRC.

In the system-shown in FIG. 1, the engine 10 operates in one of a stoichiometric combustion mode and a stratified charge combustion mode in accordance with a load thereof. In the stoichiometric combustion mode, a stoichiometric combustion is achieved in the combustion chamber 18 by changing the throttle opening SC based on the accelerator opening AC so that the volume of air supplied to the combustion chamber 18 is controlled in accordance with the acceleration opening AC. In the stratified charge combustion mode, a stratified charged combustion is achieved in the combustion chamber 18 by fully opening the throttle valve 34 so that a large volume of air is supplied to the combustion chamber 18 and by injecting a quantity of fuel corresponding to the accelerator opening AC during compression strokes of the engine 10.

According to the stratified charged combustion mode, a fuel economy is improved because a larger air-fuel ratio is achieved in the combustion chamber 18 as compared to a case of the stoichiometric combustion mode. Additionally, the fuel economy is further improved in the stratified charge combustion mode because a pumping loss of the engine 10 is reduced by the throttle valve 34 being fully opened. Therefore, from a viewpoint of improving the fuel economy, it is desirable to operate the engine 10 in the stratified charge combustion mode.

However, when a load of the engine 10 (that is, the acceleration opening AC) is increased, a quantity of fuel injected by the fuel injector 20 becomes large. In this case, the stratified charge combustion can no longer be achieved when the injection quantity exceeds a certain value, because a volume of air supplied to the intake pipe 32 (that is, a specific volume of intake air Q) becomes too small as compared to the injection quantity even if the throttle valve 34 is fully opened.

For the above reasons, the engine ECU 12 calculates the injection quantity based on the accelerator opening AC and determines whether or not the stratified charge combustion can be achieved with the calculated injection quantity. When it is determined that the stratified charge combustion can be achieved, the engine ECU 12 achieves the stratified charge combustion mode by fully opening the throttle valve 34 and controlling the injector 20 to inject a quantity of fuel corresponding to the accelerator opening AC during compression strokes of the engine 10. On the other hand, if it is determined that the stratified charge combustion cannot be achieved, the engine ECU 12 achieves the stoichiometric combustion mode by setting the throttle opening SC to be a value corresponding to the accelerator opening AC and controlling the injector 20 to inject a quantity of fuel corresponding to the throttle opening SC during intake strokes of the engine 10.

As mentioned above, in the stratified charge combustion mode, the throttle valve 34 is fully opened regardless of the accelerator opening AC. When the throttle valve 34 is fully opened, the negative pressure generated in the downstream intake passage 32a (that is, the intake manifold negative pressure PM) becomes small. Additionally, the brake booster 44 assists a brake operation and increases the master cylinder pressure $P_{M/C}$ in the booster charge state, by using the booster negative pressure PB as a power source. For these reasons, when the engine 10 is operating in the stratified charge combustion mode, it is possible that the booster negative pressure becomes insufficient for the brake booster 44 to assist a brake operation or to increase the master cylinder pressure $P_{M/C}$ in the booster charge state.

In the system of the present embodiment, when it is determined that the booster negative pressure PB may become insufficient, the intake manifold negative pressure PM is increased by reducing the throttle opening SC. In this case, the booster negative pressure PB is increased so as to equalize with this increased intake manifold pressure PM, and thus a sufficient booster negative pressure PB can be obtained. Hereinafter, the above control for increasing the intake manifold negative pressure PM by reducing the throttle opening SC is referred to as a booster negative pressure control.

As a temperature of brake fluid is lowered, viscosity of the brake fluid is increased. When the viscosity is increased, a time delay may occur from a time that the booster charge state is achieved until a pressure at the inlets of the front pumps 164 and rear pumps 170 is increased, due to the high resistance of the passages from the master cylinder 50 to the inlets of the front pump 164 and the rear pump 170. For this reason, when the temperature is low, it is possible that the fluid pressure at the inlets of the front pump 164 and the rear pump 170 has not reached a value which is required to rapidly increase the wheel cylinder pressure $P_{W/C}$ at a time when the VSC or the TRC is started.

In the system of the present embodiment, the booster negative pressure PB is increased to a larger value when the temperature is low as compared to a case where the temperature is high, in order to avoid the above-mentioned problem. For a larger booster negative pressure PB, the master cylinder pressure $P_{M/C}$ is increased at a higher rate after the booster charge state is achieved due to a larger differential pressure being generated between the booster negative pressure chamber 45 and the second negative pressure chamber 216, Thus, it is possible to compensate for the delay in transmission of fluid pressure due to the increased viscosity of the brake fluid. As a result, the fluid pressure at the inlets of the front pump 164 and the rear pump 170 can be positively increased to a required pressure at a time when the VSC or the TRC is started.

In the present embodiment, the engine ECU 12 transmits a signal to the brake ECU 60 indicating the booster negative pressure PB and the inlet temperature T at appropriate timings. The brake ECU 60 detects the booster negative pressure PB and the inlet temperature T based on the signal. When the booster negative pressure PB is below a predetermined reference value P0, the brake ECU 60 determines that the booster negative pressure PB should be increased and transmits a negative pressure requiring signal to the engine ECU 12 indicating a value of the negative pressure required in the booster negative pressure chamber 45 (hereinafter referred to as a required negative pressure value $P_{req}$) At this time, if the brake ECU 60 determines that the temperature of the brake fluid is low based on the inlet temperature T the reference value P0 is set to be a larger value as compared to a case where the temperature is high. When the engine ECU 12 receives the negative pressure requiring signal from the brake ECU 60, the booster negative pressure control is started so as to increase the booster negative pressure PB toward the required negative pressure value $P_{req}$.

Figure 5:
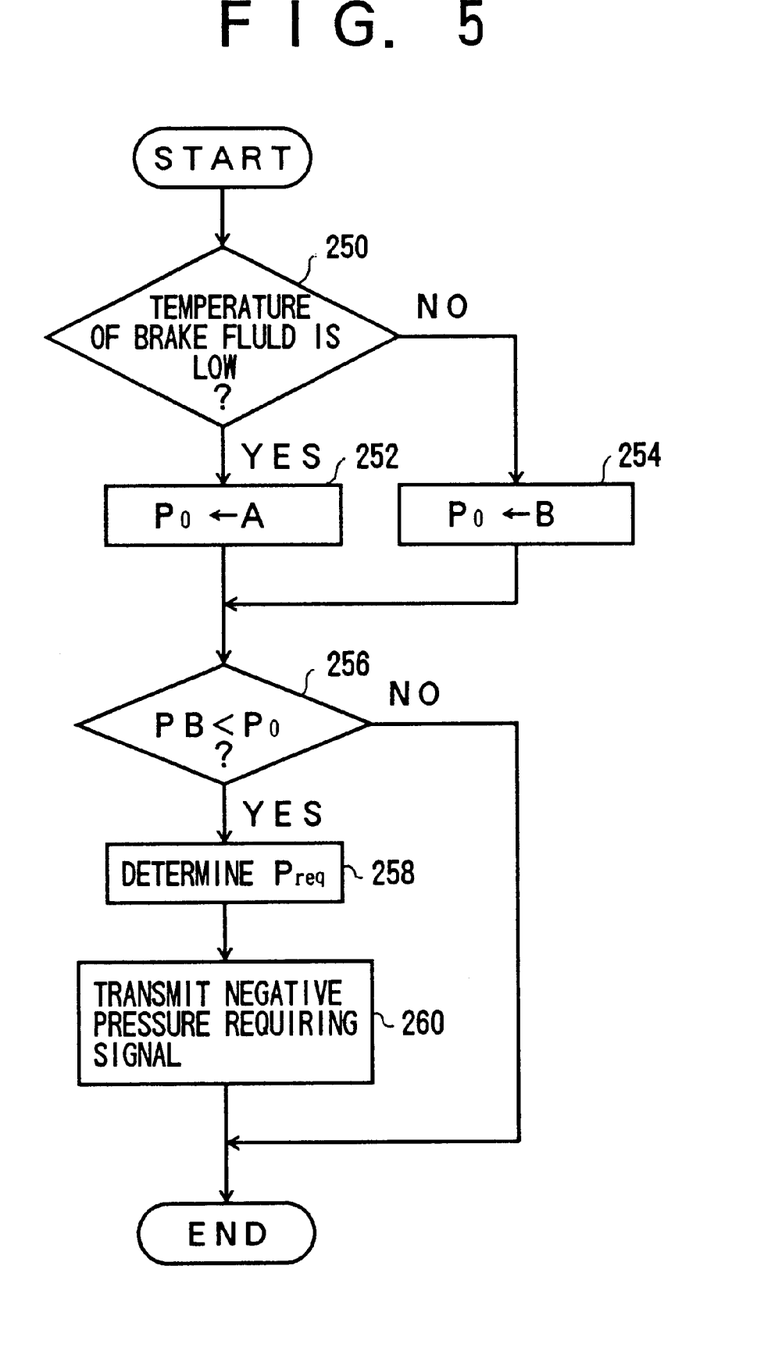
FIG. 5 is a flowchart of an example of a routine performed by a brake ECU in the present embodiment.

Now, a detailed description will be given of the processes performed by the brake ECU 60 and the engine ECU 12. FIG. 5 shows a flowchart of a routine performed by the brake ECU 60 so as to transmit the negative pressure requiring signal to the engine ECU 12 at required timings. The routine shown in FIG. 5 is started every time when one process cycle thereof is finished. When the routine shown in FIG. 5 is started, the process of step 250 is performed first.

In step 250, it is determined whether or not the temperature of the brake fluid is low. Specifically, it is determined that the temperature of the brake fluid is low when the intake temperature T is lower than a predetermined temperature T0. It is also possible to provide a sensor for detecting ambient temperature and determine that the temperature of the brake fluid is low when the ambient temperature is lower than a predetermined temperature. Further, any information relating to the temperature of the brake fluid can be used in step 250. If it is determined that the temperature of the brake fluid is low, then the process of step 252 is performed. On the other hand, if it is determined that the temperature of the brake fluid is not low, then the process of step 254 is performed.

In step 252, the reference value P0 is set to be a predetermined value A. On the other hand, in step 254, the reference value P0 is set to be a predetermined value B. The predetermined values A and B are values of the booster negative pressure PB which are required to rapidly increase the fluid pressure at the inlets of the front pump 164 and rear pump 170 at a time when the booster charge state is achieved, in a case where the temperature of the brake fluid is low and in a case where the temperature of the brake fluid is high, respectively. Thus, the predetermined values A and B satisfy a relationship A>B. According to the processes of steps 250 to 254, when the temperature of the brake fluid is low, the reference value P0 is set to be a larger value as compared to a case in which the temperature of the brake fluid is high. When the process of step 252 or 254 is finished, then the process of step 256 is performed.

In step 256, it is determined whether or not the booster negative pressure PB is smaller than the reference value P0. If it is determined that PB is not smaller than P0, it is judged that the negative pressure control need not be performed, and the present routine is ended. On the other hand, if PB is smaller than P0 in step 256, then the process of step 258 is performed.

In step 258, the required negative pressure value $P_{req}$ is set. The required negative pressure value $P_{req}$ is set to be a value of the booster negative pressure PB which is sufficient for the brake booster 44 to assist a brake operation until the vehicle stops, in accordance with a vehicle speed.

In step 260, the negative pressure requiring signal indicating the required negative pressure value $P_{req}$ is transmitted to the engine ECU 12. When the process of step 260 is finished, the present routine is ended.

Figure 6:
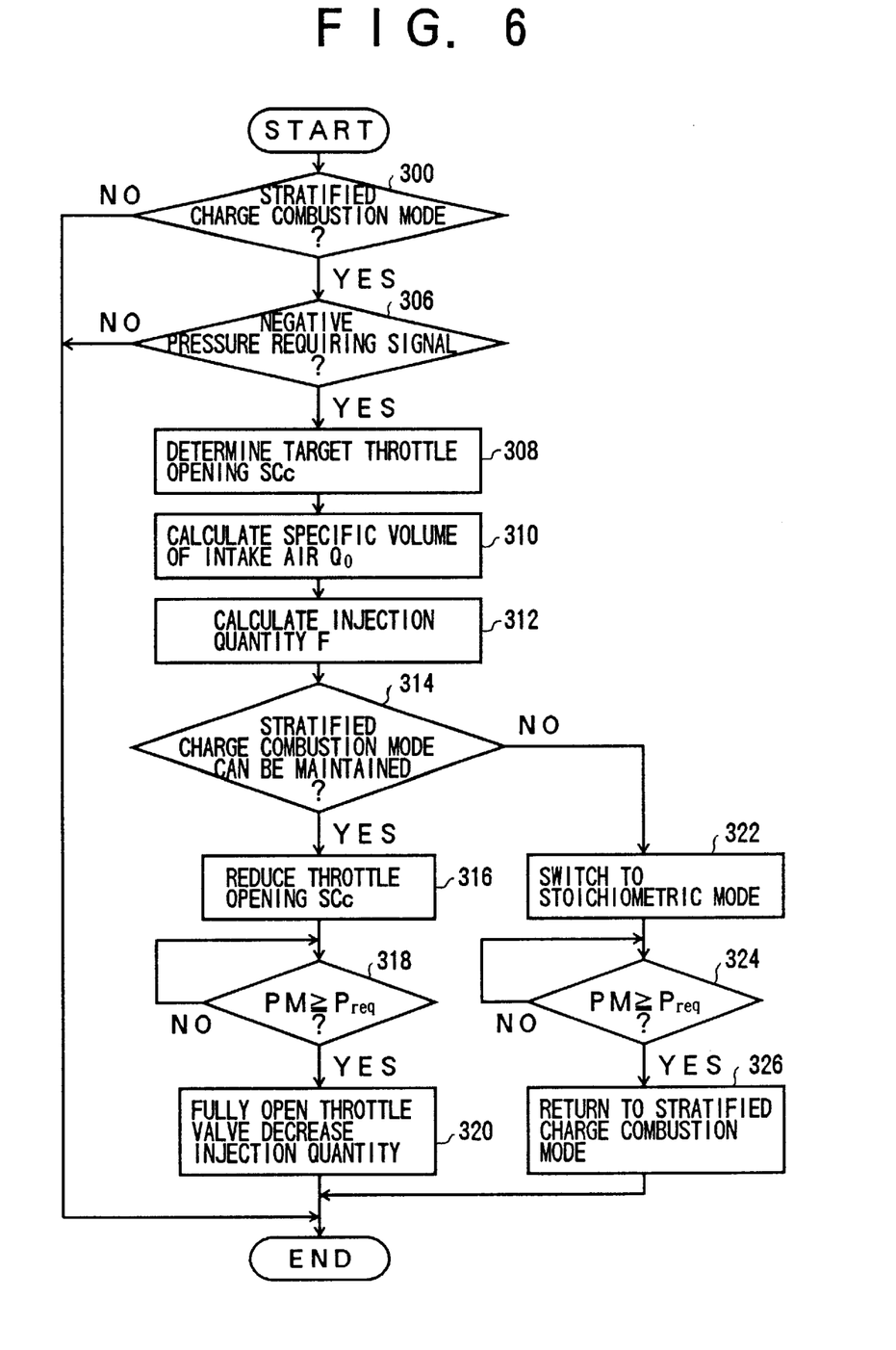
FIG. 6 is a flowchart of an example of a routine performed by an engine ECU in the present embodiment.

Now, a description will be given of a process performed by the engine ECU 12 in the present embodiment. FIG. 6 shows a flowchart of an example of a routine performed by the engine ECU 12 so as to achieve the booster negative pressure control. The routine shown in FIG. 6 is repeatedly started every time when one cycle process thereof is finished. When the routine shown in FIG. 6 is started, the process of step 300 is performed first.

In step 300, it is determined whether or not the engine 10 is operating in the stratified charge combustion mode. If it is negatively determined, that is, if the engine 10 is operating in the stoichiometric combustion mode, it is judged that the booster negative pressure control cannot be performed without decreasing the power of the engine 10. In this case, no further process is performed thereafter and the present routine is ended. On the other hand, if the engine 10 is operating in the stratified charge combustion mode in step 300, then the process of step 306 is performed.

In step 306, it is determined whether or not the negative pressure requiring signal is being transmitted from the brake ECU 60. If the negative pressure requiring signal is not being transmitted, then the present routine is ended. On the other hand, if the negative pressure requiring signal is being transmitted in step 306, then the process of step 308 is performed.

In step 308, a value of the throttle opening SC for generating an intake manifold negative pressure PM equal to the required negative pressure value $P_{req}$ (hereinafter, this value of the throttle opening SC is referred to as a target throttle opening SCc) is determined. The intake manifold negative pressure PM increases as the specific volume of intake air Q becomes smaller and the rotational speed Ne becomes greater. Additionally, the specific volume of intake air Q is substantially proportional to the throttle opening SC. Thus, in step 308, the target throttle opening SCc is determined based on the rotational speed Ne and the required negative pressure $P_{req}$. When the process of step 308 is finished, then the process of step 310 is performed.

In step 310, a value Q0 of the specific volume of intake air Q corresponding to the target throttle opening SCc is calculated. In the subsequent step 312, a value F of the injection quantity corresponding to the accelerator opening AC in the stratified charge combustion mode (that is, a value of the injection quantity which is necessary to achieve the engine power required by a driver) is calculated. It should be noted that an injection quantity necessary to achieve a constant engine power increases when the throttle opening SC is decreased to the target throttle opening SCc due to an increase in the pumping loss. In step 312, such an influence of the increase in the pumping loss is taken into consideration in calculating the injection quantity F. When the process of step 312 is finished, then the process of step 314 is performed.

In step 314, it is determined whether or not the stratified charge combustion mode can be maintained with the specific volume of intake air Q0 and the injection quantity F while maintaining the current rotational speed Ne. If it is determined that the stratified charge combustion can be maintained, then in step 316, the throttle opening SC is decreased to the target throttle opening SCc. After the process of step 316 is performed, the intake manifold negative pressure PM starts being increased toward the required negative pressure $P_{req}$. In the subsequent step 318, it is determined whether or not the intake manifold negative pressure PM has reached the required negative pressure $P_{req}$. If it is negatively determined in step 318, then the process of step 318 is performed again. On the other hand, if it is affirmatively determined in step 318, then the process of step 320 is performed.

In step 320, the throttle valve 34 is fully opened again and the injection quantity is decreased by a value corresponding to a decrease in the pumping loss due to the increase in the throttle opening SC. When the process of step 320 is finished, then the present routine is ended.

On the other hand, if, in step 314, it is determined that the stratified charge combustion mode cannot be maintained, then the operation mode of the engine 10 is switched to the stoichiometric combustion mode in step 322. In the stoichiometric combustion mode, a larger intake manifold negative pressure PM is generated as compared to a case of the stratified charge combustion mode because the throttle opening SC is decreased to a value corresponding to the accelerator opening AC. Therefore, after the process of step 322 is performed, the intake manifold negative pressure PM starts being increased.

In the subsequent step 324, it is determined whether or not the intake manifold negative pressure PM has reached the required negative pressure $P_{req}$. If it is negatively determined in step 324, then the process of step 324 is performed again. On the other hand, if it is affirmatively determined in step 324, then the process of step 326 is performed.

In step 326, the operation mode of the engine 10 is returned to the stratified charge combustion mode. When the process of step 326 is finished, the present routine is ended.

As mentioned above, when the temperature of the brake fluid is low, the reference value P0 is set to be a larger value as compared to a case where the temperature of the brake fluid is high. When the booster negative pressure value PB is smaller than the reference value P0, the booster negative pressure control is performed. Accordingly, when the temperature of the brake fluid is low, the booster negative pressure PB is maintained to be larger as compared to a case where the temperature of the brake fluid is high. Thus, the master cylinder pressure $P_{M/C}$ is increased at a higher rate when the booster charge state is achieved in a case where the viscosity of the brake fluid is high due to the low temperature. In this case, the fluid pressure supplied to the inlets of the front pump 168 and rear pump 170 can be rapidly increased. Therefore, according to the system of the present embodiment, the wheel cylinder pressure can be controlled with a fast response time when the VSC or the TRC is started.

It may be possible to avoid the above-mentioned problem due to the increased viscosity of the brake fluid by always generating a large booster negative pressure PB regardless of the temperature of the brake fluid, that is, by always using the predetermined value A as the reference value P0. In this case, however, the booster negative pressure control is performed with an unnecessarily high frequency when the temperature of the brake fluid is high.

As mentioned above, when the booster negative pressure control is performed, fuel economy is deteriorated due to an increase in the pumping loss and a shift from the stratified charge combustion mode to the stoichiometric combustion mode. Thus, it is desirable to minimize usage of the booster negative pressure control in view of improving fuel economy of the engine 10. In the present embodiment, the booster negative pressure control is performed only when the temperature is low. Thus, according to the system of the present embodiment, it is possible to improve the response of the VSC or TRC controlling the wheel cylinder pressure $P_{W/C}$ while avoiding unnecessary execution of the booster negative pressure control and thereby maintaining a high fuel economy.

In the above-mentioned embodiment, the response of the VSC or the TRC controlling the wheel cylinder pressure $P_{W/C}$ is improved by achieving the booster charge state before the VSC or the TRC is started so that the fluid pressure at the inlets of the pumps is increased. However, it should be noted that the present invention can also be applied to a system which performs an automatic brake control such as the VSC or the TRC by directly supplying brake fluid which is pressurized by a brake booster to wheel cylinders.

Additionally, in the above-mentioned embodiment, the reference value P0 is switched between two levels, namely, a level for a case where the temperature is low and a level for a case where the temperature is high. However, the reference value P0 may be switched among three or more levels or may be linearly changed.

Further, in the above-mentioned embodiment, execution of the booster negative pressure control is permitted only when the engine 10 is operating in the stratified charge combustion mode, in view of giving priority to maintaining the engine power rather than maintaining the booster negative pressure PB. However, it is also possible to give priority to maintaining the booster negative pressure PB. That is, it is possible to forcibly decrease the throttle opening SC in the stoichiometric combustion mode when a larger booster negative pressure PB is required. In this sense, the present invention can be applied to a normal engine whose power is controlled based on the throttle opening SC (that is, an engine which always operates in the stoichiometric combustion mode).

The present invention is not limited to the embodiment, but variations and modifications may be made without departing from the scope of the present invention.

The present application is based on Japanese priority application No. 10-158022 filed on Jun. 5, 1998, the entire contents of which are hereby incorporated by reference.

What is claimed is:

1. A negative pressure control apparatus for a brake booster for controlling a negative pressure in a negative pressure chamber of the brake booster, which apparatus is provided in a system having a booster charge mechanism for generating a fluid pressure by using the negative pressure in the negative pressure chamber and a fluid pressure control mechanism for controlling a brake fluid pressure by using the fluid pressure generated by said booster charge mechanism, the apparatus comprising:

a negative pressure controller for controlling the negative pressure in said negative pressure chamber to be at least a predetermined target negative pressure;

a temperature detector for detecting information relating to a temperature of brake fluid; and a target negative pressure setting part for setting said predetermined target negative pressure based on the temperature of the brake fluid.

2. The negative pressure control apparatus for a brake booster as claimed in claim 1, wherein said target negative pressure setting part sets said predetermined target negative pressure to be a larger value when said temperature of the brake fluid is relatively low as compared to a case where the temperature of the brake fluid is relatively high.

3. The negative pressure control apparatus for a brake booster as claimed in claim 1, wherein said brake booster includes a second chamber, and said booster charge mechanism generates the fluid pressure by using a differential pressure between said negative pressure chamber and said second chamber generated by supplying atmospheric pressure to said second chamber.

4. The negative pressure control apparatus for a brake booster as claimed in claim 1, wherein said fluid pressure control mechanism achieves an automatic brake control by controlling the brake fluid pressure based on a behavior of a vehicle.

5. The negative pressure control apparatus for a brake booster as claimed in claim 4, wherein said automatic brake control comprises a vehicle stability control and/or a traction control.

6. The negative pressure control apparatus for a brake booster as claimed in claim 1, wherein said negative pressure chamber is connected to an intake pipe of an engine at a position downstream of a throttle valve, and said negative pressure controller controls the negative pressure in said negative pressure chamber by changing an opening of said throttle valve.

7. The negative pressure control apparatus for a brake booster as claimed in claim 6, wherein said engine operates in at least one of a stoichiometric combustion mode and a stratified charge combustion mode, and said negative pressure control apparatus further comprises:

a mode determining part for, when said negative pressure controller changes the opening of the throttle valve while the engine is operating in the stratified charge combustion mode, determining whether or not the stratified charge combustion mode can be maintained; and a mode switching part for switching the operation mode of the engine to said stoichiometric combustion mode when said mode determining part determines that the stratified charge combustion mode cannot be maintained.

8. A negative pressure control method for controlling a negative pressure in a negative pressure chamber of a brake booster provided in a system having a booster charge mechanism for generating a fluid pressure by using the negative pressure in the negative pressure chamber and a fluid pressure control mechanism for controlling a brake fluid pressure by using the fluid pressure generated by said booster charge mechanism, the method comprising:

controlling the negative pressure in said negative pressure chamber to be at least a predetermined target negative pressure;

detecting information relating to a temperature of brake fluid; and setting said predetermined target negative pressure based on the temperature of the brake fluid.

9. The negative pressure control method as claimed in claim 8, wherein said predetermined target negative pressure is set to be a larger value when said temperature of the brake fluid is relatively low as compared to a case where the temperature of the brake fluid is relatively high.

10. The negative pressure control method as claimed in claim 8, wherein said brake booster includes a second chamber, and said booster charge mechanism generates the fluid pressure by using a differential pressure between said negative pressure chamber and said second chamber generated by supplying atmospheric pressure to said second chamber.

11. The negative pressure control method as claimed in claim 8, wherein an automatic brake control is achieved by controlling the brake fluid pressure based on a behavior of a vehicle.

12. The negative pressure method as claimed in claim 11, wherein said automatic brake control comprises a vehicle stability control and/or a traction control.

13. The negative pressure control method as claimed in claim 8, wherein said negative pressure chamber is connected to an intake pipe of an engine at a position downstream of a throttle valve, and the negative pressure in said negative pressure chamber is controlled by changing an opening of said throttle valve.

14. The negative pressure control method as claimed in claim 13, wherein said engine operates in at least one of a stoichiometric combustion mode and a stratified charge combustion mode, and said negative pressure control method further comprises:

determining, when said negative pressure controller changes the opening of the throttle valve while the engine is operating in the stratified charge combustion mode, whether or not the stratified charge combustion mode can be maintained; and switching the operation mode of the engine to said stoichiometric combustion mode when it is determined that the stratified charge combustion mode cannot be maintained.

* * * * *